United States Patent
Lejeune

(10) Patent No.: US 8,166,513 B2
(45) Date of Patent: Apr. 24, 2012

(54) TV RECEIVER USING CABLE CARD FOR ABSTRACTING OPEN CABLE APPLICATION PLATFORM (OCAP) MESSAGES TO AND FROM THE HEAD END

(75) Inventor: Stephane Lejeune, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 768 days.

(21) Appl. No.: 12/049,561

(22) Filed: Mar. 17, 2008

(65) Prior Publication Data

US 2009/0064262 A1     Mar. 5, 2009

Related U.S. Application Data

(60) Provisional application No. 60/969,728, filed on Sep. 4, 2007.

(51) Int. Cl.
*H04N 7/173* (2011.01)

(52) U.S. Cl. ........................................ 725/131

(58) Field of Classification Search .......... 725/116–117, 725/120–121; 719/313–318, 328–329
See application file for complete search history.

(56) References Cited

U.S. PATENT DOCUMENTS

| | | | |
|---|---|---|---|
| 2004/0019913 A1* | 1/2004 | Wong et al. | 725/139 |
| 2005/0198502 A1 | 9/2005 | Cha et al. | |
| 2005/0204391 A1 | 9/2005 | Hunleth et al. | |
| 2006/0020950 A1* | 1/2006 | Ladd et al. | 719/328 |
| 2007/0028260 A1 | 2/2007 | Williams et al. | |
| 2007/0050294 A1 | 3/2007 | Trottier et al. | |
| 2007/0250872 A1* | 10/2007 | Dua | 725/81 |
| 2008/0010664 A1* | 1/2008 | Pelizza et al. | 725/134 |
| 2008/0134156 A1* | 6/2008 | Osminer et al. | 717/140 |
| 2010/0332558 A1* | 12/2010 | Adams | 707/803 |

OTHER PUBLICATIONS

OpenCable(TM) Application Platform Specification OCAP 1.0 Profile OC-SP-OCAP1.0-116-050803, Copyright 2005, Cable Television Laboratories, p. 1-626.*

Digeo, Inc. "Digeo® Expands Industry-Acclaimed Moxi Cable Product Family with Next Generation Moxi™ HD DVR and Moxi for OCAP", http://www.digeo.com/press_pressrelease.aspx?id=5.

* cited by examiner

*Primary Examiner* — Dominic D Saltarelli
*Assistant Examiner* — Alfonso Castro
(74) *Attorney, Agent, or Firm* — John L. Rogitz

(57) ABSTRACT

A TV receiver such as a set-top box has an Open Cable Application Platform (OCAP) programming interface that communicates with interactive digital video applications such as pay-per-view applications to enable a viewer to communicate requests, purchase orders, and the like to a head end. A cable card provides both decryption of incoming video from the head end as well as translation functionality that transforms standardized messages into a proprietary protocol recognizable to the head end. The OCAP has an API that interfaces with the application and that directs standardized messages from the application to the standardized interface of the removable cable card ensuring common reliance on the translation functionality built in to the cable card.

18 Claims, 2 Drawing Sheets

TV RECEIVER USING CABLE CARD FOR ABSTRACTING OPEN CABLE APPLICATION PLATFORM (OCAP) MESSAGES TO AND FROM THE HEAD END

This claims priority from U.S. provisional patent application 60/969,728, filed Sep. 4, 2007, incorporated herein by reference.

FIELD OF THE INVENTION

The present invention relates generally to TV receivers that use removable cable cards for conditional access (CA).

BACKGROUND OF THE INVENTION

Removable cable cards, which provide proprietary decryption functionality for received TV audio and video, have been provided to enable consumers to purchase TV receivers such as set-top boxes in one cable provider area, then use them in another cable provider area should the consumer move there or otherwise wish to use the receiver there. In essence, instead of having to buy an entire new set-top box when a consumer moves from one cable provider area to another, which otherwise is necessary to be able to decrypt TV programming using the typically proprietary encryption scheme of the cable provider, the user need only acquire a new and relatively less expensive cable card. Thus, cable cards are removably engageable with TV receivers to provide the necessary decryption functionality, and each cable provider can lease cable cards with its own proprietary encryption scheme to consumers who move into that provider's area. The remainder of the set-top box or other TV receiver advantageously remains useful in all cable provider areas because the remaining components of the receiver typically are not proprietary.

Recent trends have provided receivers that support not just conventional one-way communication from the TV signal head end to the receiver, but also two-way communication, to support so-called "interactive digital video". Examples of interactive digital video include pay-per-view, in which a TV receiver user can input certain requests and commands, as well as purchase orders, for pay-per-view programming using the TV receiver, and video-on-demand, entailing many of the same communication considerations. Also, so-called "switched digital" can be implemented using two-way TV receivers. Switched digital in essence allows all the viewers in a particular area to in essence report back to the head end what channel they are viewing, so that, for instance, the head end may take intelligent steps with respect to bandwidth such as ceasing transmission into the area of a channel that is not currently being viewed by anyone in the area and thereby releasing bandwidth for other uses.

Partly to support such two-way interactive digital video, the Open Cable Application Platform (OCAP) has been introduced. In effect, OCAP defines an application platform interface implemented by the TV receiver platform which allows software applications, downloaded to the receiver, to communicate with the receiver through a common standard interface and exploit its functionality. In turn, the OCAP interface communicates through the receiver's communication port with the TV signal head end. In this way, for example, viewer purchases of video-on-demand may be facilitated, with the purchased video then transmitted from the head end to the receiver, to be decrypted by the cable card of the receiver and then displayed on the TV screen.

As understood herein, the use of OCAP can entail rather expensive hardware requirements, and some consumers may not desire the added OCAP functionality and instead prefer a less expensive receiver. As also understood herein, in such receivers it would be desirable to allow third parties to provide applications that do not rely on OCAP, to support certain functionalities such as certain graphical user interfaces for the TV including cross-media bars, etc.

The present invention further recognizes, however, that each cable provider, in addition to implementing its own proprietary encryption scheme, also typically employs a proprietary application protocol from the TV receiver back to the head end. With this understanding in mind, the present invention recognizes that the cable card may have further use, in addition to decrypting incoming video, in also transforming outgoing messages from the third party applications in the receiver (which do not necessarily know the cable provider's proprietary application protocol to the head end) into messages that are understandable by the head end.

SUMMARY OF THE INVENTION

Accordingly, while such functionality in the cable card is desirable, the present invention makes the following critical observation. If OCAP and/or its applications are programmed to know the proprietary application protocol of the cable provider and, hence, to bypass the transformation capability in the cable card, those applications will fail to work across multiple networks and the efficacy of the transformation capability in the cable card, which recall is provided by the cable provider whose OCAP-based applications might not otherwise require it, is not stresses and cannot be guaranteed. In other words, the present invention critically recognizes that to ensure the proper working of the transformation capability in the cable card, all applications, both OCAP and non-OCAP, should commonly rely on the capability.

With the above in mind, a TV receiver such as a set-top box or TV has a receptacle that removably receives a cable card. The cable card has a decryption capability. A computer-readable medium that can be used by a processor is also provided, and the medium bears a first application which provides a first functionality including an interactive digital video functionality that permits a user to send messages from the receiver to a TV signal head end. A first programming interface communicates with the first application. As set forth further below, the first programming interface is configured to send messages from the first application to the cable card for transformation thereof into a predetermined proprietary protocol understandable by the head end.

In some implementations a third party application providing a second functionality also transmits messages to the cable card without sending the messages through the programming interface. The kernel of the programming interface can be the Open Cable Application Platform (OCAP), with the added features disclosed herein. More particularly, the OCAP includes a first application programming interface (API) that is configured for communicating with the first application, which may be, e.g., an interactive pay per view (IPPV) application. If desired, the OCAP can include second and third APIs configured for communicating with respective second and third applications. The second application can be a video on demand (VOD) application, with the third API being a switched digital application.

In another aspect, a computer readable medium is disclosed that can be used by a digital processor. The medium bears an Open Cable Application Platform (OCAP) programming interface which includes a first application programming interface (API) configured for communicating with a first application. The first application has an interactive digital video functionality. The first API is configured to send messages from the first application to a removable cable card for abstracting information in the messages. The cable card also has a video decryption capability.

In still another aspect, a method includes providing a cable card that is removably engageable with a TV receiver for decrypting video from a head end and providing decrypted video to the receiver for display thereof. The cable card also transforms standardized messages to/from applications associated with the receiver into the proprietary protocol usable by the head end. A first application is also provided, with the first application providing a first functionality including an interactive digital video functionality. A first programming interface communicates with the first application. The first programming interface is configured to send messages from the first application to the cable card for transformation thereof into the application protocol usable by the head end.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
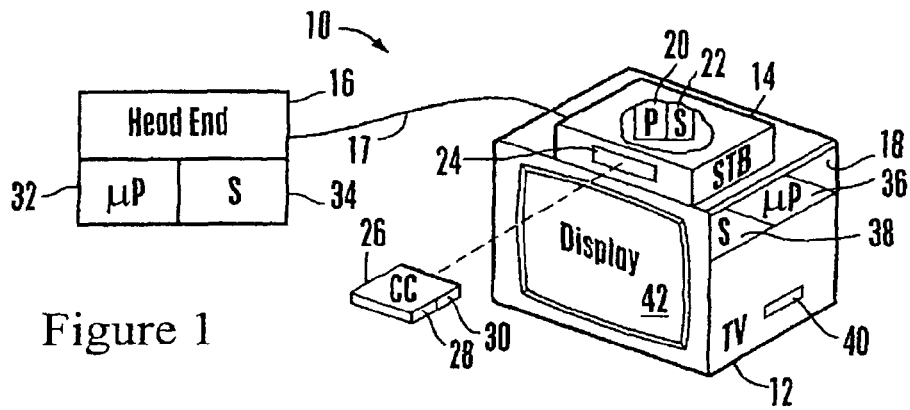
FIG. 1 is a non-limiting hardware block diagram of a system in accordance with present principles, with portions of the STB and TV cutaway for clarity and with the cable card shown in an exploded relationship with the STB.

Referring initially to FIG. 1, a system is shown, generally designated 10, which includes a television 12 receiving, via a set-top box (STB) 14, audio video TV programming from a head end 16, such as a cable or satellite head end, over a wired or wireless link 17. The STB 14 and TV 12 are examples of receivers. Other examples include set-back boxes. While the STB 14 is shown separately housed from the chassis 18 of the TV 12, it is to be understood that the functionality of the STB 14 may be incorporated into the chassis 18.

As shown, the STB 14 includes a STB processor 20 and a computer readable medium 22 such as volatile or non-volatile solid state storage, disk storage, tape storage, or other type of electronic storage medium or logic circuitry that typically can be executed by the processor 20. The STB 14 is also formed with a receptacle 24 for removably receiving a cable card 26. It is to be understood that while FIG. 1 shows a removable cable card, the term "cable card" also includes chips that are intended to be permanently mounted in a component such as a STB with only the software contained on the chip being "removable".

Moreover, while the element 26 is referred to herein as a "cable card", it is to be understood that present principles apply not only to cable TV systems but also to satellite systems and other TV systems. Accordingly, "cable card" means a removable or non-removable module that undertakes both decryption of audio video content as well as translation for the purpose of abstracting messages to/from the applications discussed below into a protocol that is understood by the head end 16. To this end, the cable card 26 may have its own internal processor 28 and electronic storage medium 30. Likewise, the head end 16 typically includes one or more head end processors 32 and computer readable media 34. In some implementations the cable card may be established by two modules, one for decryption and one for protocol translation.

Additionally, as shown the TV 12 typically includes a TV processor 36 and data storage medium 38. The TV 12 may also include a TV receptacle 40 for removably receiving the cable card 26 in the event that no STB is provided. Once the cable card 26 decrypts audio video from the head end 16 using a typically proprietary decryption algorithm and keys, the video may be presented on a display 42 of the TV 12, e.g., a flat panel matrix display, cathode ray tube, or other appropriate video display.

Figure 2:
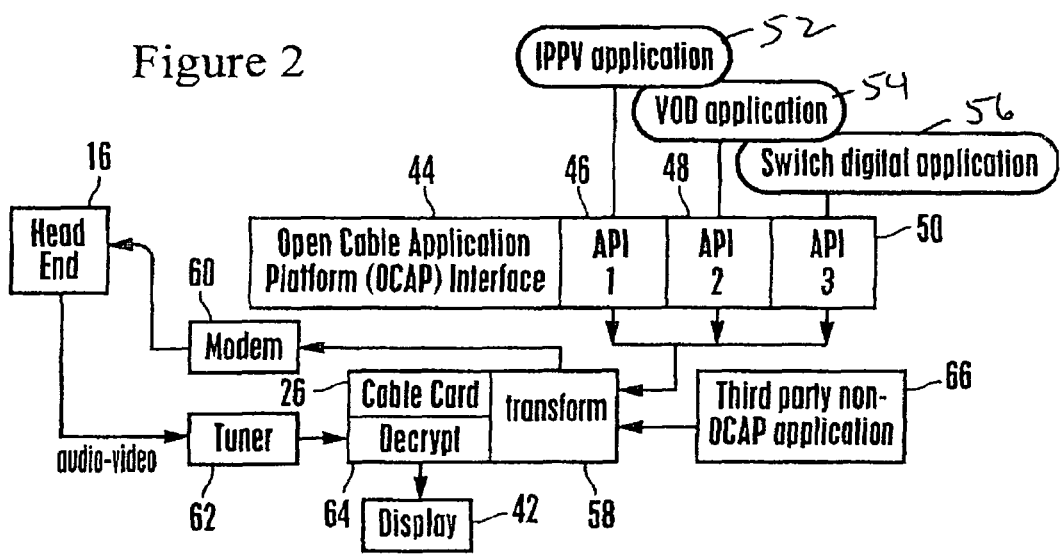
FIG. 2 is a non-limiting block diagram of a software architecture in accordance with present principles.
Figure 3:
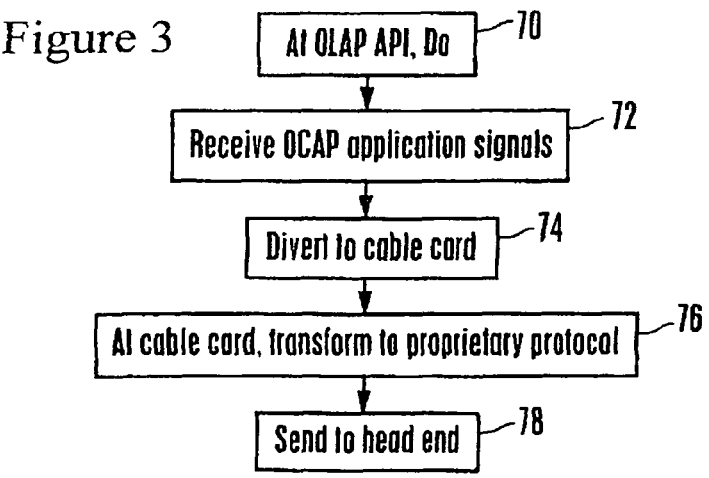
FIG. 3 is a flow chart of non-limiting logic in accordance with present principles.

It is to be understood that the software architecture shown in FIG. 2 and the logic shown in FIG. 3 is implemented on one or more of the TV 12, and/or STB 14, and/or other TV receiver, for cooperation with the cable card 26.

Turning now to FIG. 2, as shown an interface such as an open cable application platform (OCAP) interface is provided. The interface 44 may be implemented on the STB memory 22 for execution by the STB processor 20. Or, the interface 44 may be implemented elsewhere, e.g., on the TV storage 38 for execution by the TV processor 36. A non-limiting example OCAP specification without the below-described APIs is available at www.openeable.com.

In accordance with present principles, the present inventive aspect provides one or more application programming interfaces (API) to the OCAP interface 44. In the embodiment shown, first through third API 46, 48, 50 are shown, for communicating with respective OCAP applications 52, 54, 56 for purposes to be shortly disclosed. The OCAP applications may be interactive digital video applications. Accordingly, the first application 52 may be an interactive pay-per-view (IPPV) application that can be invoked by a user to, e.g., browse, select, and pay for pay-per-view programs from the head end 16. The second application 54 may be a video on demand (VOD) application that enables viewers to, e.g., browse, select, and pay for VOD programs from the head end 16, typically with trick play features such as fast forward, pause, rewind, etc. On the other hand, the third application 56 may be a switched digital application to function in accordance with switched digital principles discussed above.

Accordingly, each API 46, 48, 50 is tailored to communicate with one or more respective applications, typically interactive video applications, and to send messages to/from the application to a transformer function 58 in the cable card 26. The transformer function transforms or otherwise renders the standardized messages it receives into an application protocol, typically proprietary, that is recognized by the head end 16. The cable card 26 then forwards the proprietary messages through a modem 60 in, e.g., the STB 14 to the head end. In response, the head end 16 may provide proprietary messages and signals including audio video streams back through a TV tuner 62 in, e.g., the STB 14. These proprietary messages may be transformed into standardized messages and these messages may be decrypted by a decrypt function 64 of the cable card 26, typically proprietary to the same cable company as is the transform function 58. Decrypted audio video signals are sent to the TV 12 where video may be displayed on the display 42 and audio played over TV speakers. The standardized responses may be forwarded to the applications.

Additionally, one or more non-OCAP third party applications 66 such as user interface applications and the like may be provided in the STB 14 and/or TV 12 and may also communicate with the head end 16 to receive, e.g., electronic program guide (EPG) information. Like the OCAP applications 52-56, the non-OCAP application 66 can communicate with the head end 16 by virtue of sending its messages through the transform function 58 of the cable card 26, even though the head end may recognize a protocol unknown to the non-OCAP application 66.

It may now be appreciated that the APIs 46-50 facilitate the execution of the functions of the respective underlying applications 52-56. In the case of, e.g., IPPV, these functions include, by way of example only, allowing the user to obtain price options from the head end, select a video display format, select a human language in which the program is desired, select a video quality, obtain a receipt from the head end should a PPV stream be purchased, obtain purchasing history, etc. A non-limiting example IPPV API 46 is appended to the end of this specification.

FIG. 3 illustrates the high level logic provided by one of the OCAP APIs discussed above, as well as logic performed by the cable card. Commencing at block 70, the OCAP API passes control to block 72, wherein messages such as commands, calls, etc. are received from the respective OCAP application. The messages are processed as appropriate and diverted at block 74 to the transformer function 58 of the cable card 26.

Block 76 represents that at the cable card 26, the messages are transformed to the typically proprietary application protocol recognized by the head end 16. This transformation may be regarded as an abstraction of the calls from the OCAP application into a format suitable for the head end 16. The messages are then sent through the modem 60 to the head end 16 at block 78.

Figure 4:
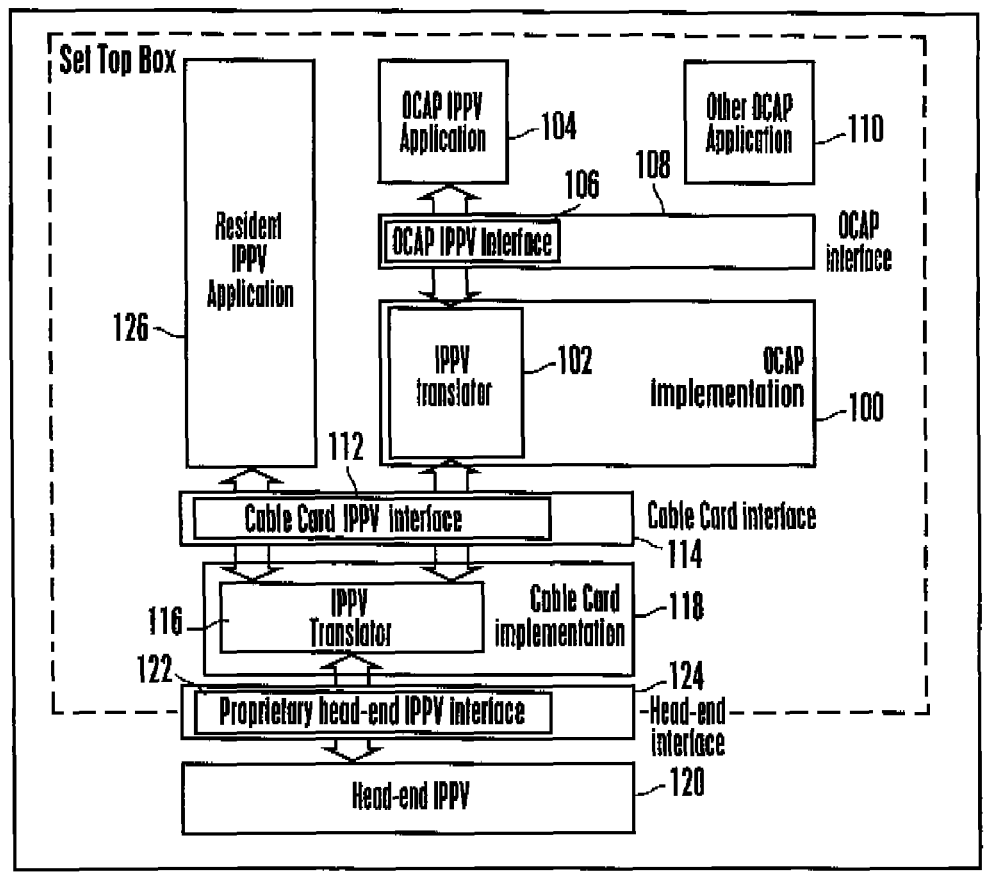
FIG. 4 is another non-limiting block diagram of a software architecture in accordance with present principles.

FIG. 4 shows a detailed architecture that can be implemented in a set-top box, set-back box, or even in a TV chassis. In FIG. 4, an OCAP implementation 100 includes an IPPV translator 102 communicating with one or more OCAP applications 104 through an OCAP IPPV interface 106 of an OCAP interface block 108. Other OCAP applications 110 can also be provided. The function of the IPPV translator 102 and OCAP IPPV interface 106 is to cooperate to intercept the standardized messages from the IPPV application 104 divert the messages to the protocol transformer or translator function 116 of a cable card 118.

Thus as shown, the IPPV translator 102 of the OCAP implementation 100 can communicate, through a standardized cable card IPPV interface 112 of a cable card interface 114, with a message translator such as the IPPV translator 116 of the cable card implementation 118, which is a translator function of the cable card that is in addition to the mere video decryption function. In turn, the IPPV translator 116 of the cable card implementation 118 can communicate with a head-end IPPV 120 through a proprietary head-end IPPV interface 122 of a head-end interface 124 as shown. Also, as shown in FIG. 4 the IPPV translator 116 of the cable card implementation 118 can communicate with a resident (non-OCAP) IPPV application 126 through the cable card IPPV interface 112.

Thus, in the architecture of FIG. 4, the IPPV translator is provided for the OCAP implementation and the OCAP IPPV interface is provided for the OCAP interface, such that the OCAP IPPV application does not communicate directly with the head-end IPPV except through a IPPV message translator of the cable card using the IPPV translator 102 and OCAP IPPV interface 106 as shown.

While the particular TV RECEIVER USING CABLE CARD FOR ABSTRACTING OPEN CABLE APPLICATION PLATFORM (OCAP) MESSAGES TO AND FROM THE HEAD END is herein shown and described in detail, it is to be understood that the subject matter which is encompassed by the present invention is limited only by the claims.

What is claimed is:

1. A TV receiver, comprising:
  at least one receptacle removably receiving a cable card having at least one decryption capability; and
  a computer-readable medium usable by a processor and bearing thereon:
    at least a first application providing at least a first functionality including at least one interactive digital video functionality permitting a user to send messages from the receiver to a TV signal head end;
    at least a first programming interface communicating with the first application, the first programming interface configured to send messages from the first application to a video translator portion of the cable card for transformation thereof into a predetermined protocol understandable by the head end; and
    at least a second application providing at least a second functionality permitting a user to transmit messages to the cable card without sending the messages through the programming interface, the second application communicating with the translator portion of the cable card for transformation thereof into the predetermined protocol, wherein the translator portion of the cable card is provided for an Open Cable Application Platform (OCAP) implementation and an OCAP interface is also provided such that the first application does not communicate directly with the head end except through the translator portion of the cable card.

2. The receiver of claim 1, comprising the cable card.

3. The receiver of claim 1, wherein the programming interface is Open Cable Application Platform (OCAP).

4. The receiver of claim 3, wherein the OCAP is associated with at least a first application programming interface (API) configured for communicating with the first application, the first application being an interactive pay per view (IPPV) application.

5. The receiver of claim 4, wherein the OCAP is associated with second and third APIs configured for communicating with respective second and third applications, the second application being a video on demand (VOD) application, the third API being a switched digital application.

6. The receiver of claim 1, wherein the receiver is implemented in a set-top box separate from a TV chassis.

7. The receiver of claim 1, wherein the receiver is implemented in a TV chassis.

8. A non-transitory computer readable medium usable by a digital processor and bearing:
  an Open Cable Application Platform (OCAP) programming interface;
    the OCAP programming interface including at least a first application programming interface (API) configured for communicating with a first application, the first application having an interactive digital video functionality, the first API configured to send messages from the first application to a translator portion of a removable cable card for abstracting video information in the messages, the cable card also having at least a video decryption capability; and
    at least a second application providing at least a second functionality, the second application not communicating through an API to send messages from the second application to the translator portion of the removable cable card.

9. The medium of claim 8, wherein the first application is an interactive pay per view (IPPV) application.

10. The medium of claim 8, wherein the first application is on the medium.

11. The medium of claim 9, wherein the OCAP is associated with second and third APIs configured for communicating with respective third and fourth applications, the third application being a video on demand (VOD) application, the fourth application being a switched digital application.

12. The medium of claim 8, wherein the medium is implemented in a set-top box separate from a TV chassis.

13. The medium of claim 8, wherein the medium is implemented in a TV chassis.

14. A method comprising:
providing a cable card removably engageable with a TV receiver for decrypting video from a head end and providing decrypted video to the receiver for display thereof, the cable card also transforming messages from applications associated with the receiver into an application protocol usable by the head end;
providing at least a first application providing at least a first functionality including at least one interactive digital video functionality;
providing at least a first programming interface communicating with the first application, the first programming interface configured to send video signals from the first application to the cable card for transformation thereof into the application protocol usable by the head end; and
providing at least a second application providing at least a second functionality and transmitting messages to the cable card without sending the messages through the programming interface, the cable card transforming information from the second application into information usable by the head end.

15. The method of claim 14, wherein the programming interface is Open Cable Application Platform (OCAP).

16. The method of claim 15, wherein the OCAP is associated with at least a first application programming interface (API) configured for communicating with the first application, the first application being an interactive pay per view (IPPV) application.

17. The method of claim 16, wherein the OCAP is associated with second and third APIs configured for communicating with respective third and fourth applications, the third application being a video on demand (VOD) application, the fourth application being a switched digital application.

18. The method of claim 14, wherein the method is implemented in a set-top box separate from a TV chassis, or is implemented in a TV chassis.

* * * * *